(12) United States Patent
Nilsson et al.

(10) Patent No.: US 11,696,641 B2
(45) Date of Patent: Jul. 11, 2023

(54) SUSPENSION SYSTEM AND GLIDER UNIT

(71) Applicant: Elfa International AB, Västervik (SE)

(72) Inventors: Peter Nilsson, Västervik (SE); Tobias Ringenhag, Västervik (SE)

(73) Assignee: Elfa International AB, Västervik (SE)

( * ) Notice: Subject to any disclaimer, the term of this patent is extended or adjusted under 35 U.S.C. 154(b) by 0 days.

(21) Appl. No.: 17/192,851

(22) Filed: Mar. 4, 2021

(65) Prior Publication Data

US 2021/0274933 A1    Sep. 9, 2021

(30) Foreign Application Priority Data

Mar. 4, 2020 (SE) .................................. 2050246-4
Mar. 2, 2021 (WO) ................. PCT/SE2021/050175

(51) Int. Cl.
*A47B 88/40* (2017.01)
*A47B 57/42* (2006.01)
(Continued)

(52) U.S. Cl.
CPC .............. *A47B 88/40* (2017.01); *A47B 57/42* (2013.01); *A47B 88/423* (2017.01);
(Continued)

(58) Field of Classification Search
CPC ....... A47B 88/40; A47B 57/42; A47B 88/423; A47B 96/061; A47B 96/07; A47B 88/43; A47B 96/028; A47B 2088/401; A47B 96/025; A47B 96/1408; A47B 2210/0024; A47B 2097/008; F16M 13/022
(Continued)

(56) References Cited

U.S. PATENT DOCUMENTS 205,722 A    7/1878  Brodie et al.
4,387,872 A * 6/1983  Hogue .................. A47B 57/42
                                                       248/221.11
(Continued)

FOREIGN PATENT DOCUMENTS

BR    102015028485 A2    5/2017
CN       102469879 A     5/2012
(Continued)

OTHER PUBLICATIONS

Office Action issued in related Swedish Application No. 2050246-4, dated Aug. 3, 2020.
(Continued)

*Primary Examiner* — Muhammad Ijaz
(74) *Attorney, Agent, or Firm* — Hubbard Law, PLLC; Marc A. Hubbard

(57) ABSTRACT

The present disclosure relates to a suspension system comprising a hang standard having slots and being configured to be vertically arranged, and a bracket configured to be attached to the hang standard in a cantilevered fashion using connectors on a proximal end of the bracket that enter slots on along the hang standard. A slider unit is adapted to be mounted on the bracket and to carry a container or other component. A rearwardly extending portion of the slider unit is arranged on the slider unit to reach into one of the slots of the hang standard occupied by a connector of the bracket to prevent the slider unit from tilting forward on the bracket.

14 Claims, 3 Drawing Sheets

(51) Int. Cl.
    *A47B 88/423*     (2017.01)
    *A47B 96/06*     (2006.01)
    *A47B 96/07*     (2006.01)
    *F16M 13/02*     (2006.01)

(52) U.S. Cl.
    CPC ............ *A47B 96/061* (2013.01); *A47B 96/07* (2013.01); *F16M 13/022* (2013.01)

(58) Field of Classification Search
    USPC .......................................... 248/241; 211/192
    See application file for complete search history.

(56) References Cited

U.S. PATENT DOCUMENTS

| | | | |
|---|---|---|---|
| 6,505,800 B1 * | 1/2003 | Abdullah | A47B 96/061 |
| | | | 135/913 |
| 7,104,411 B2 | 9/2006 | Magnusson et al. | |
| 9,335,089 B1 | 5/2016 | Gossens | |
| 10,016,057 B1 | 7/2018 | Arnautovic et al. | |
| 2004/0020884 A1 * | 2/2004 | Magnusson | A47B 57/42 |
| | | | 211/90.01 |
| 2007/0241072 A1 * | 10/2007 | Bryant | A47B 96/061 |
| | | | 211/90.02 |
| 2016/0316939 A1 * | 11/2016 | Kraiss | F21V 23/06 |
| 2019/0110593 A1 * | 4/2019 | Nilsson | A47B 96/028 |
| 2019/0330902 A1 | 10/2019 | Chen et al. | |

FOREIGN PATENT DOCUMENTS

| | | |
|---|---|---|
| KR | 101617352 B1 | 5/2016 |
| KR | 101651916 B1 | 8/2016 |
| WO | 2005046401 A1 | 5/2005 |
| WO | 2018175499 A1 | 9/2018 |

OTHER PUBLICATIONS

International Search Report issued in corresponding Application No. PCT/SE2021/050175, dated Mar. 9, 2021.
Written Opinion issued in corresponding Application No. PCT/SE2021/050175, dated Mar. 9, 2021.

* cited by examiner

SUSPENSION SYSTEM AND GLIDER UNIT

RELATED APPLICATIONS

This application claims priority to Swedish application no. 2050246-4, filed Mar. 4, 2020, and to Patent Cooperation Treaty application no. PCT/SE2021/050175, filed Mar. 2, 2021, each of which is incorporated herein in their entirety for all purposes.

FIELD OF INVENTION

The present disclosure relates to a suspension system for mounting a sliding support, such a drawer slide, on cantilevered brackets extending from vertical standards.

BACKGROUND

U.S. Pat. No. 7,104,411B2 discloses an example of modular system with drawers that can be set up in different configurations. The modular system comprises cantilevered brackets adapted to be connected to standards arranged vertically, such as by attaching them to a wall or supporting them on a base or other object. A suspension system mounts the drawer to the standards in a cantilevered fashion. The suspension makes use drawer slides mounted to the cantilevered brackets to suspend a drawer between the cantilevered brackets in a manner that allows the drawer to be pulled or extended outwardly, away from the standards, to gain better access.

Drawer slides are an example of sliding support assembly that are used to mount, shelves, and other storage components to be a base structure such as a cabinet or frame in a manner that allows for extension and support of the component in a cantilevered fashion relative to a base structure. A sliding support will typically have two (or possibly more) elements or parts that cooperate to allow one part to slide with respect to the other between a retracted position and an extended position, in which the sliding support is subjected to a bending moment. One of the slidable parts is adapted to be attached to the base structure and another of the slidable parts is adapted to be connected to the extendable structure. In the example of a typical drawer slide, one slide part is affixed to a cabinet frame or box using fasteners, such as wood screws, and the other sliding part is affixed to the drawer, shelf or other storage component using fasteners such as screws. To allow a "full extension" of a drawer, the drawer slider may include a third sliding part between the first and second sliding parts. Sliding supports may, optionally, incorporate wheels or ball bearings to support for larger loads while reducing friction between the slidable elements.

SUMMARY

The present disclosure concerns a system for suspending an extendable drawer, shelf, or other component of modular system from vertical hang standards, and in particular sliding units that enable end user to connect them more reliably to cantilevered brackets.

In a representative, non-limiting example, a slider unit is comprised of an assembly of two or more relatively slidable part, one of which is adapted to be mounted to a cantilevered bracket and the other is adapted to be connected to storage system component such a drawer, basket, or shelf, and a rearwardly-extending portion that is configured for insertion into one of the plurality of slots arranged in one or more columns on a hang standard. When the slider unit is hung on the cantilevered bracket, the rearwardly extending portion is arranged on the slidable part of the slider unit so that it extends into and be received within one of the slots of the hang standard.

As the center of mass of the combination of the slider unit and a drawer or other component mounted to the slider unit shifts forward due to extension of the slider unit, the rearwardly extending portion with the mounting of the slider unit to prevents it from pivoting about its forward mounting point on the bracket. The slider unit is therefore kept on the bracket as the drawer or other component mounted to the slider unit is pulled outwardly. Because the rearwardly extending portion inserts into a slot when the slider unit is fit on the bracket, the slider unit can be more reliably installed by an end user.

The portion of the slider unit extending into the slot may, optionally, be positioned or arranged on the slider unit so that it is inserted into the same slot as a connector on the bracket when mounted on the bracket. This arrangement useful particularly when a container is fitted to the slider unit and the center of mass of the slider unit and the container in combination moves away significantly from the hang standard. In this case, the distance between the center of mass and the slot in the hang standard will be minimized for each position of the container when the rearwardly-extending portion of the slider unit is inserted into the same slot as a connector extending from the bracket. This arrangement has the effect of maximizing the contact force between the edge of the slot and the rearwardly extending portion of the slider unit.

According to another representative, non-limiting embodiment, the portion of the slider unit that extends into and is received in a slot is arranged so that, when the slider unit is mounted to the bracket, it slides into a slot that is one of lower of the slots of the plurality of slots occupied by the bracket when it is connected to a hang standard. Locating the rearwardly extending portion of the slider unit in a lower slot increases a component of the force that is directed along the hang standard, thereby reducing the risk that the portion of the slider may accidentally be pulled or pivoted out of the slot.

The portion of the slider unit reaching into a slot of the hang standard may reach into the same slot as a tab of the bracket. A user may readily connect the slider unit to a bracket and then insert the rearwardly extending portion of the slider unit and a connector tab of bracket into the hang standard at the same time.

In an embodiment in which the rearwardly extending portion of the slider unit reaches into the slot is the same slot as the tab extending from the slider unit, and rearwardly extending portion of the slider unit may include a bent portion adapted to extend around the end of a tab of the bracket. This may keep the rearwardly extending portion of the slider unit even more reliably in place in the slot.

In any of the foregoing embodiments and examples, a front tab may be, optionally, arranged on a front end of the slider unit and adapted to engage with a cut-out at the distal end of the bracket to provide additional reliability.

DETAILED DESCRIPTION OF EXEMPLARY EMBODIMENTS

In the following description, like numbers refer to like elements.

Figure 1A:
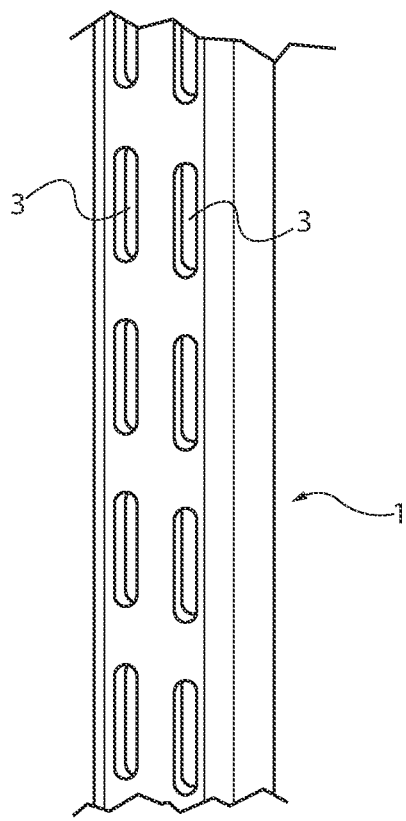
FIG. 1A shows a part of a hang standard.

The present disclosure relates generally to suspension arrangements intended to be used in connection with hang standards. Hang standard 1 in FIG. 1A is a non-limiting, representative example of a hang standard found in the prior art. In the illustrated example the hang standard 1 has a U-shaped cross section, although other configurations are possible, and includes one or more rows of elongated slots 3 in the mid part of the U-shaped cross section. Hang standards are typically made from sheet metal, are well known, and are typically used oriented vertically, attached to a vertical surface such as a wall or the like, or are used in a free-standing configuration with feet, for instance.

Figure 1B:
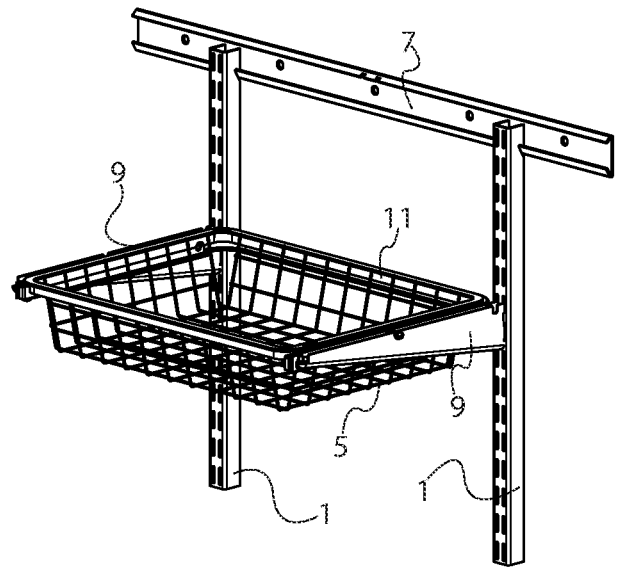
FIG. 1B shows a perspective view of a prior art example of suspension system.
Figure 3:
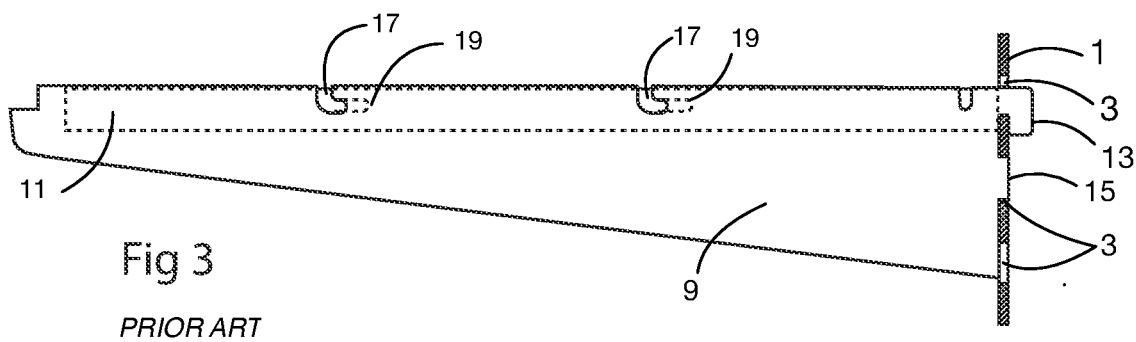
FIG. 3 is a side view and a partial cross section of the representative example of a cantilevered bracket attached to a hang standard before a prior art drawer slider is attached to the bracket.
Figure 4:
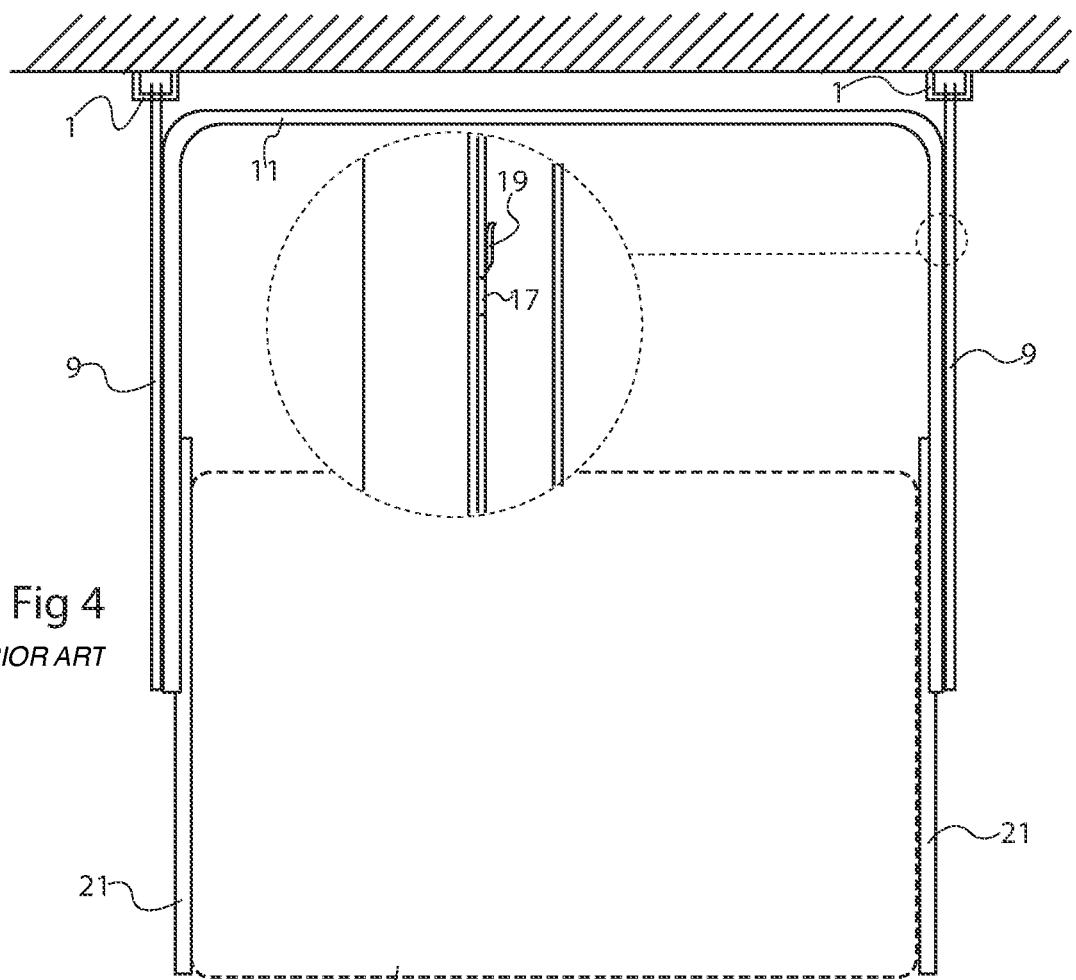
FIG. 4 shows a schematic top view of a prior art suspension system.

FIG. 1B illustrates two hang standards 1 that are used to suspend a container 5 in the form of a wire drawer. The hang standards 1 in turn are suspended from a rail 7 attached to a wall with screws or the like. As an alternative, the hang standards 1 could be directly screwed to the wall or attached in any other manner. To each hang standard 1, a bracket 9 is attached, and at least one slider unit. In the example of FIGS. 3 to 4, the at least one slider unit is comprised of a U-shaped slider frame 11 that is attached to the brackets 9. The slider frame comprises a first slidable part of the at least one slider unit, which remains fixed with respect to the brackets. It cooperates with movable (with respect to the brackets 9) slidable parts 21, which are connected to container 5. The combination of the U-shaped frame and the slidable parts 21 allows container 5 to be carried by the brackets but also pulled outwardly form the hang standard to an extended position, like a drawer would be pulled from a chest of drawers or a cabinet. This is useful, for instance, if a plurality of such containers 5 are attached to and arranged in a stacked fashion on the same set hang standards. Pulling the container 5 out exposes its contents, which may otherwise be concealed beneath another container 5 located directly above, for instance.

Figure 2:
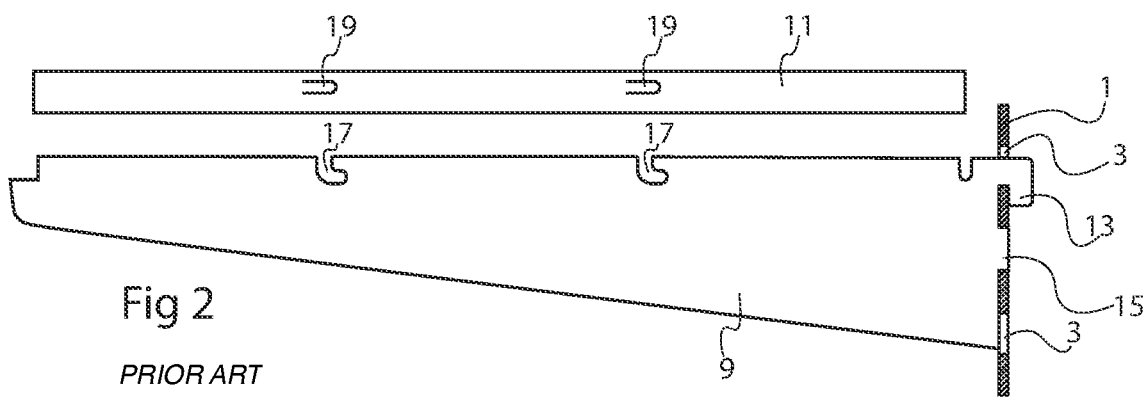
FIG. 2 is a side view and a partial cross section of a representative example of a bracket attached to a hang standard before a frame of a drawer slide is attached to the bracket.

FIGS. 2 and 3 illustrate schematically connecting a slider frame 11 to a bracket 9 attached to a hang standard 1. The bracket 9 is connected at a proximal end to the hang standard 1 in a cantilevered manner and is usually made from sheet metal.

The bracket 9 that is illustrated is a representative and non-limiting example of a prior art bracket. This particularly bracket is formed by bending sheet metal into U-shaped cross section, the depth of which tapers towards its distal end. A hook 13 is punched in each leg of the U-shape at the proximal end of the bracket 9, and each hook 13 may, as illustrated, be inserted into a respective elongated slot 3 in the hang standard 1 and is able to suspend the bracket 9 from the hang standard 1 by hanging from the bottom edge of the elongated slots 3. However, other types of brackets can be used, including ones that are flat, not U-shaped, and have a single leg.

In addition to the hooks 13, auxiliary tabs 15 may, optionally, be provided below the hooks 3, which enter the elongated slots 3 directly under the ones of the hooks 13. The auxiliary tabs 15 serve to stabilize the connection and prevent the bracket 9 from moving straight upwards in relation to the hang standard 1. The tab therefore reduces the risk for an accidental disconnection of the bracket 9 from the hang standard 1.

L-shaped slots 17 are provided in at least one of the upper edges of the bracket 9. The L-shaped slots 17 are intended to connect with lateral connector tabs 19 punched out on at least one of the sides of the slider frame 11. The slider frame 11 is fitted to the bracket 9 as illustrated in FIG. 3. This is done by guiding the slider frame connector tabs 19 into the L-shaped slots in the top of the bracket 9 until they reach the far end of the L-shape, at which point a locking feature (not shown) locks them in this position. This suspends the slider frame 11 from the side of the bracket 9. The L-shape of the slots 17 impede or prevent the tabs from moving straight upwards. This means that the inner part of the slider frame 11, closest to the wall, will be prevented from rotating forwardly when the mass center of the slider frame 11, including the container 5 and any objects stored therein, moves in front of the outer L-shaped slot 17.

This extended position of the container is illustrated in FIG. 4, which shows a schematic top view of the prior art suspension system shown in FIGS. 2 and 3 in an assembled state. The slider frame 11 includes a slidable part that is U-shaped part which is connected to both a left and a right bracket 9 in the way described above, remaining fixed with respect to the brackets 9. The enlarged portion of the drawing showing one connector tab 19 reaching into one of the slots 17 in the bracket 9 for suspending the slider frame 11 therefrom. The right and left movable (with respect to the supporting brackets) slidable parts 21 are guided by fixed slidable parts of slider frame 11 that are adjacent to the brackets. The container 5 is attached to the right and left slidable parts 21 such that it can be pulled out to an extended position, as illustrated. Either the container 5 can be directly connected to the slidable parts 21, or a frame can be suspended in between the slidable parts 21 in which frame the container 5 can be placed. The slidable parts 21 may comprise connectors for connecting to the container 5.

FIGS. 5-9 to illustrate a representative, non-limiting example of an embodiment of method and structure for connecting a slider unit to a cantilevered bracket that is easier to assemble as compared to the prior art suspension system shown in FIGS. 2 to 5, and yet safe in that it is capable of more preventing unintended rotation of the slider unit on the bracket. A slider unit is adapted in manner that allows it to be mounted on a cantilevered bracket by merely suspending it on the bracket while simultaneously interacting with a hang standard to which the bracket is mounted. This makes possible a system that reliably prevents the slider unit from rotating or pitching forwardly, and that can be adapted to work different types of bracket configurations, including brackets with two walls likes like bracket 9 and brackets with a single wall. It further, and optionally, enables the optional use of lateral connectors or other connection means for connecting the slider unit to a bracket that, at least as compared to the connection means shown in FIGS. 1 to 4, make it easier for an end user to mount a slider unit to the cantilevered bracket. Because the connection means need not (but, optionally, may) prevent the rotation of the slider unit on the bracket, the connection means may be configured to make it easier for an end user to mount reliably the slider unit on the bracket as compared to the connection means used to mount and restrain the slider unit on a bracket illustrated in connection with FIGS. 1 to 4.

Figure 5:
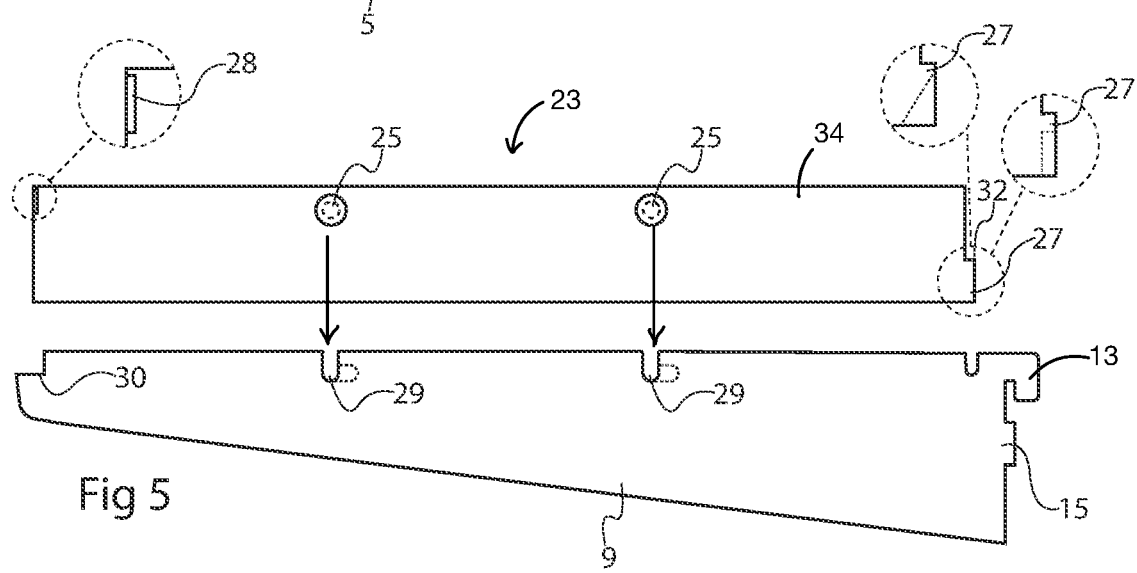
FIGS. 5 and 6 show, before and after assembling, respectively, a side view and partial cross section of an embodiment of a slider unit according to the present disclosure mounted on bracket attached to a hang standard and a slider unit.
Figure 6:
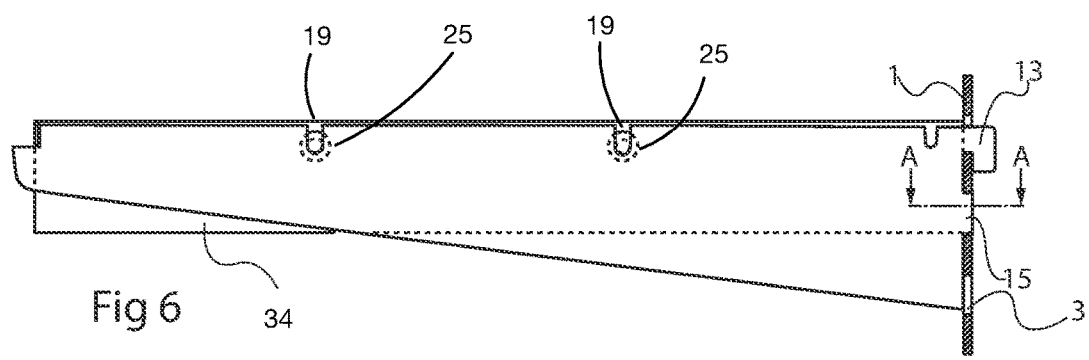

FIGS. 5 and 6 show, before and after assembling, a side view and partial cross section of a bracket 9 attached to a hang standard 1 when a slider unit 23 according to the present disclosure is attached to the bracket 9. This slider unit 23 comprises laterally extending connectors in the form of knobs 25 or buttons that may be inserted in slots 29 of the bracket 9, to suspend the slider unit 23 therefrom. Those slots can, as indicated with dotted lines, be L-shaped slots, like the L-shaped slots 17 of the bracket of FIG. 2. The slider unit 23 may be fitted with the known bracket 9 without modification. However, the slots 29 need not have an L-shaped configuration when used with slider unit 23.

The slider unit 23 is further provided with a rear or rearwardly-extending tab 27, which, when the slider unit 23 is attached to the bracket 9, becomes positioned in register with the auxiliary tab 15 of the bracket 9. The slider unit 23 is attached to the bracket 9, and subsequently the slider unit 23 and bracket 9 combination is attached to a hang standard 1 as illustrated in FIG. 6. There, the rear tab 27 of the slider unit 23 extends into a slot 3 in the hang standard together with the auxiliary tab 15 of the bracket, as is also illustrated in the cross section of FIG. 7. By providing a rear tab 27, which may extend into the same slot 3 in the hang standard 1 as the tab 15 of the bracket 9, the slider unit 23 and its rear tab 27 are less conspicuous and provide a more favorable visual impression as compared to the prior art.

In this configuration, even if the slider unit 23 carries a load with a center of mass far in front of the lateral connector, such the knob 25, that is most distant from the hang standard 1, the slider unit 23 will be kept in place as the rear tab 27 inserted in the hang standard slot 3 prevents the slider from tilting or rotating forward by reason of the rear tab 27 abutting the upper rim of the slot 3. This can be used with or without the L-shaped configuration of the bracket slots 29. In either embodiment, the connection can be made more reliable because the lever from the fulcrum, meaning the distance from the distal or front lateral connector (knob 25) to the rear tab 27, can be minimized (independent of the position of the center of mass and the size of the mass of the slider unit and the container), and the contact force between the rear tab 27 and the upper rim of the slot 3 may be maximized. If the rear tab 27 had been insertable into another slot 3, positioned higher up in the hang standard 1, the lever would have been longer, and the contact force would therefore have been smaller. Further, the contact force would not have been directed in the longitudinal direction of the hang standard 1, but at an angle thereto. Both these factors may lead to a less reliable connection between the rear tab 27 and the hang standard 1. Though optional, a connection between the rear tab 27 and the hang standard 1 in a lower one of the slots 3 occupied by the bracket 9, as shown in the figures, can be advantageous.

The rear tab 27 may take up some or all of the full height of the slot 3. In one exemplary embodiment, a top edge 32 of the rear tab 27 contacts the upper edge of the slot 3 when inserted therein, which reduces movement of the rear tab 27 and thus may improve the stability of the slider unit on the bracket.

In addition to the rear tab 27, the slider unit 23 may comprise, at its opposite end, a front tab 28 that is able to rest on a cut-out 30 in the distal end of the bracket 9. This may provide even more stability to the connection between the slider unit 23 and the bracket 9.

Figure 7:
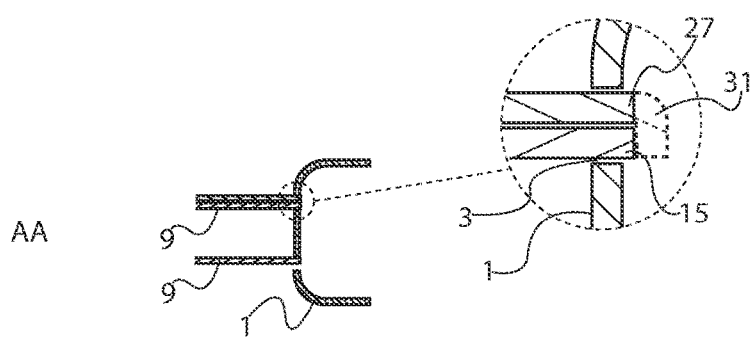
FIG. 7 illustrates a cross section along A-A in FIG. 6.

As shown in the cross section of FIG. 7, it may be advantageous in some cases to provide the slider unit rear tab 27 with a bent end portion 31 that is bent to abut the rear edge of the bracket auxiliary tab 15. This prevents the slider unit 23 from slipping in a horizontal direction such that the slider unit tab 27 leaves the hang standard slot 3. This may be advantageous for instance if a bracket 9 with L-shaped slots 29 is used as indicated in FIG. 5, then this or some other locking means is suggested to avoid the knobs 25 slipping in the horizontal portion of the L-shaped slots 29.

Figure 8:
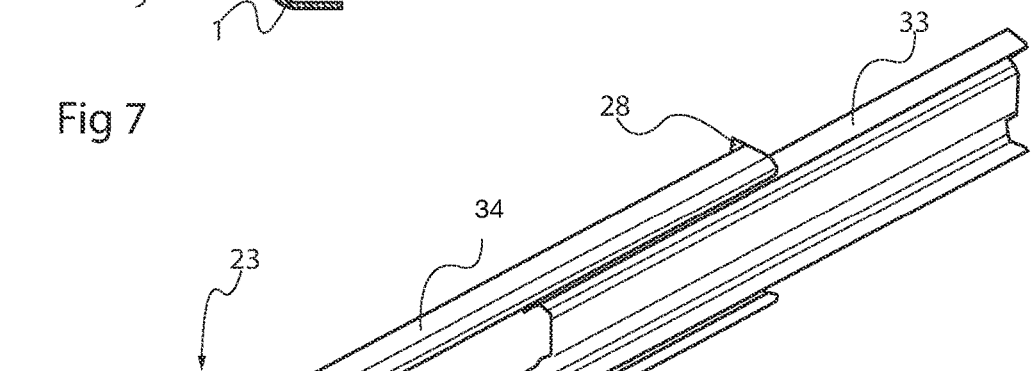
FIG. 8 shows schematically a perspective view of a slider modified according to the present disclosure.
Figure 9:
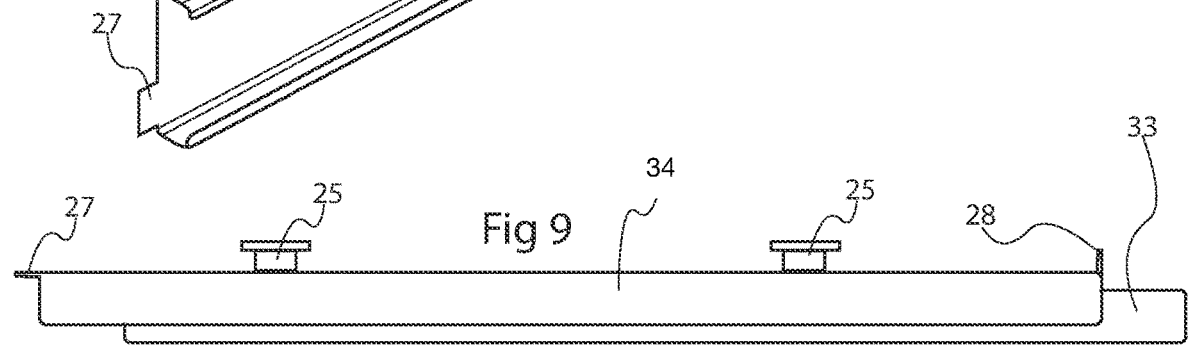
FIG. 9 shows schematically a top view of a slider unit according to the present disclosure.

FIG. 8 shows schematically a perspective view of a slider unit 23 modified according to the present disclosure and FIG. 9 shows schematically a top view of such a slider unit. This slider may for instance being devised as illustrated in US-2019/0330902-A1 with two slidable parts, one of which is fixed to the bracket—fixed part 34—and one or more of which are moveable parts 33 configured to slide in the fixed part 34 in a manner that allows them to extend telescopically. The slider unit 23 may further comprise additional features such as braking and retracting functions (not shown) that are well known per se.

The fixed slider part 34 of the slider unit 23 is provided with the rear tab 27 and connector knobs 25 (cf. FIG. 9) as discussed above. Additionally, a container or other component may be connected to the slidable parts 33 using in any means, including in the same or similar manner as previously discussed. Separate slider units 23 that are mutual mirror images, one for the bracket to the left and one for the bracket to the right, may be, optionally, provided. A U-shaped slider frame similar to the U-shaped frame 11 shown in FIG. 4, may be substituted for a pair of fixed slidable parts 34. Additionally, a front tab 28 may be provided as previously mentioned. A container 5 in the form of, for instance, a mesh or wire basket, or other type of drawer, shelf, or storage component, may located in between the telescopically moveable slider parts 33.

The foregoing description is of non-limiting examples and embodiments. All embodiments are, unless otherwise noted, non-limiting examples of one or more inventive features. Alterations and modifications to the disclosed embodiments may be made without departing from the invention, which is defined and limited only by the appended claims. The meaning of the terms used in this specification are, unless stated otherwise, intended to have their ordinary and customary meaning to those in the art and are not intended to be limited to specific implementations that may be described.

What is claimed is:
1. A suspension system comprising:
a hang standard having slots and being configured to be vertically arranged;
a bracket configured to be attached to the hang standard in a cantilevered fashion, wherein the bracket comprises connectors adapted for insertion into the slots of the hang standard; and a slider unit comprising cooperating first and second slidable parts, the first slidable part being adapted to mount to the bracket and the second slidable part adapted for carrying a storage component, the slider unit further comprising a rearwardly-extending portion arranged on the first slidable part for extending into a slot on the hang standard when the slider unit is mounted on the bracket.

2. The suspension system of claim 1, wherein the rearwardly extending portion of the slider unit is arranged on the first slidable part to into the same slot of the hang standard as one of the connectors of the bracket.

3. The suspension system according to claim 1, wherein the rearwardly extending portion of the slider unit for extending into the slot is comprised of a tab.

4. The suspension system according to claim 3, wherein one of the connectors on the bracket is comprised of an auxiliary tab and wherein the tab of the slider unit is arranged on the first slidable part for extending into the same slot as the auxiliary tab when the slider unit is mounted on the bracket.

5. The suspension system according to claim 4, wherein the tab of the slider unit includes a bent portion adapted to enclose an end of a tab of the bracket.

6. The suspension system according to claim 1, wherein a front tab on the slider unit is adapted to connect with a cut-out at a distal end of the bracket.

7. The suspension system according to claim 1, wherein the rearwardly extending portion of the slider unit that reaches into a slot of the hang standard reaches into the same slot as a connector tab of the bracket.

8. A slider unit comprising laterally extending connectors for insertion into corresponding slots in a cantilevered bracket for mounting the slider unit on the bracket and a rearwardly extending tab arranged on the slider with respect to the laterally extending connectors to extend into a slot of a hang standard when the slider unit is mounted on the bracket and the laterally extending connectors extend from a proximal end of the bracket are inserted into slots on the hang standard.

9. The slider unit of claim 8, wherein the slider unit comprises first and second slidable parts and the laterally extending connectors and rearwardly extending tab are disposed on the first slidable part.

10. The slider unit of claim 9, wherein the second slidable part is telescopically received within the first slidable part.

11. The slider unit of claim 8, wherein the rearwardly extending tab is arranged with respect to the laterally extending connectors such that, when the slider unit is mounted to the bracket, the rearwardly extending tab of the slider unit is registered with one of the laterally extending connectors of the bracket to extend into the same slot on the hang standard.

12. The slider unit of claim 8, wherein one of the laterally extending connectors on the bracket is comprised of an auxiliary tab and wherein the rearwardly extending tab of the slider unit is arranged on the slider unit for extending into the same slot as the auxiliary tab when the slider unit is mounted on the bracket.

13. The slider unit of claim 12, wherein the tab of the slider unit includes a bent portion adapted to enclose an end of a tab of the bracket.

14. The slider unit of claim 8, wherein a front tab on the slider unit is adapted and arranged on the slider unit with respect to the laterally extending connectors to cooperate with a cut-out at a distal end of the bracket when mounted to the bracket.

* * * * *